United States Patent
Bommarito et al.

(10) Patent No.: US 6,821,207 B2
(45) Date of Patent: Nov. 23, 2004

(54) DRIVESHAFT ASSEMBLY WITH RETENTION MECHANISM

(75) Inventors: Michael J. Bommarito, Portage, MI (US); Steven P. Gillihan, Kalamazoo, MI (US); Joseph P. Flanagan, Portage, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 10/372,998

(22) Filed: Feb. 24, 2003

(65) Prior Publication Data

US 2004/0166946 A1 Aug. 26, 2004

(51) Int. Cl.$^7$ .............................. F16D 3/44; F16B 21/06
(52) U.S. Cl. .................. 464/130; 411/519; 403/DIG. 7
(58) Field of Search ................. 411/517, 518, 411/519, 352, 353; 464/130, 128, 132, 905; 403/DIG. 7

(56) References Cited

U.S. PATENT DOCUMENTS

| | | | |
|---|---|---|---|
| 1,993,357 A | * | 3/1935 | Braun et al. ............... 464/130 |
| 2,544,631 A | | 3/1951 | Heimann et al. |
| 2,595,787 A | | 5/1952 | Heimann et al. |
| 2,660,913 A | | 12/1953 | Frisby |
| 2,883,899 A | | 4/1959 | Bluth |
| 3,062,026 A | | 11/1962 | Pitner |
| 3,178,907 A | | 4/1965 | Lyons |
| 3,214,204 A | | 10/1965 | Carter |
| 3,460,427 A | | 8/1969 | Baumgarten |
| 3,937,035 A | * | 2/1976 | Fisher et al. ............... 464/130 |
| 3,986,238 A | * | 10/1976 | Fisher ..................... 29/898.07 |
| 4,000,628 A | | 1/1977 | Funatani et al. |
| 4,006,659 A | | 2/1977 | Wurzel et al. |
| 4,151,779 A | | 5/1979 | Timmer |
| 4,184,242 A | | 1/1980 | Petrie |
| 4,242,775 A | | 1/1981 | Eickmann |
| 4,343,581 A | | 8/1982 | Millheiser |
| 5,201,233 A | | 4/1993 | Skinner et al. |
| 5,352,079 A | | 10/1994 | Croskey |
| 5,988,523 A | * | 11/1999 | Scott ......................... 239/114 |
| 6,162,126 A | | 12/2000 | Barrett et al. |
| 6,280,335 B1 | | 8/2001 | Wehner et al. |
| 6,336,868 B1 | | 1/2002 | Kurecka et al. |

* cited by examiner

*Primary Examiner*—David Bagnell
*Assistant Examiner*—K. Thompson
(74) *Attorney, Agent, or Firm*—Harness, Dickey & Pierce P.L.C.

(57) ABSTRACT

A universal joint includes a yoke with a leg having an aperture extending therethrough. The aperture includes an annular groove. The universal joint also includes a cruciform having a trunnion, a bearing cup positioned in the aperture and mounted on the trunnion and retention ember including a stepped cross-section. The retention member is disposed within the groove to fill the gap remaining between the groove edge and bearing cup.

14 Claims, 3 Drawing Sheets

DRIVESHAFT ASSEMBLY WITH RETENTION MECHANISM

BACKGROUND OF THE INVENTION

The present invention generally relates to a universal joint for use in a driveline of a motor vehicle. More specifically, the present invention pertains to a universal joint equipped with a retention member for securing a bearing cup in a yoke.

As is commonly known, universal joints are used in motor vehicle driveline applications for interconnecting a pair of rotary shafts and permitting changes in angularity therebetween. Many conventional universal joints include a pair of bifurcated yokes which are secured to the rotary shafts. The bifurcated yokes are interconnected by a spider or a cruciform for rotation about independent axes. The spider includes four orthogonal trunnions with each opposing pair of axially aligned trunnions mounted in a pair of aligned bores formed in the bifurcated yokes. Typically, a bearing cup is secured in each bore and a bearing assembly is retained in the bearing cup such that each yoke is supported for pivotal movement relative to one of the pairs of trunnions.

Various retention methods have been developed for securing the bearing cups to the yokes in a manner wherein the rotary axis of each yoke is aligned centrally with respect to the rotary axis of the spider. Traditional bearing cup retention methods include the use of grooves and planar snap rings. However, this method has one or more disadvantages such as, for example, excessive machining requirements, limited serviceability, and high cost of manufacture. In particular, one type of conventional universal joint utilizes a planar snap ring seated in a circumferential groove machined into the bore formed in the yokes for axially retaining the bearing cups. However, due to the dimensional variation of each component, either an interference condition or an excess clearance between the bearing cup and the snap ring is accumulated. If an interference condition exists, one or both of the bifurcated yokes is mechanically deformed to increase the spacing between the previously machined grooves. If an excess clearance condition exits, a Belleville washer may be disposed between the bearing cup and the snap ring to preload the bearing. Alternatively, an assembler may be provided with a plurality of snap rings having different thicknesses. The assembler uses a trial and error method to fit the largest snap ring possible within the clearance.

Other universal joint retention devices attempt to compensate for the dimensional variation in the components but sacrifice serviceability. Several examples of bearing cup retention arrangements and methods associated with conventional universal joints are disclosed in U.S. Pat. Nos. 3,062,026, 3,178,907 and 4,000,628.

SUMMARY OF THE INVENTION

Accordingly, the present invention is directed to overcoming the disadvantages commonly associated with the manufacture and subsequent service of conventional universal joints. Therefore, it is an object of the present invention to reduce the number of components and cost required to construct an easily serviceable universal joint assembly.

The present invention is directed to a universal joint for interconnecting a pair of rotating shafts. The universal joint includes a yoke with a leg having an aperture extending therethrough. The aperture includes an annular groove. The universal joint also includes a cruciform having a trunnion, a bearing cup positioned in the aperture and mounted on the trunnion and a retention member including a stepped cross-section. The retention member is disposed within the groove to fill the gap remaining between the groove edge and the bearing cup. The stepped cross-section of the retention member at least partially enters the groove and engages the bearing cup.

Further areas of applicability of the present invention will become apparent from the detailed description provided herein after. It should be understood however that the detailed description and specific examples, while indicating preferred embodiments of the invention, are intended for purposes of illustration only since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

In general, the present invention is directed to a universal joint of the type used in motor vehicle driveline applications for interconnecting rotating shafts in a manner permitting changes in angularity therebetween.

Figure 1:
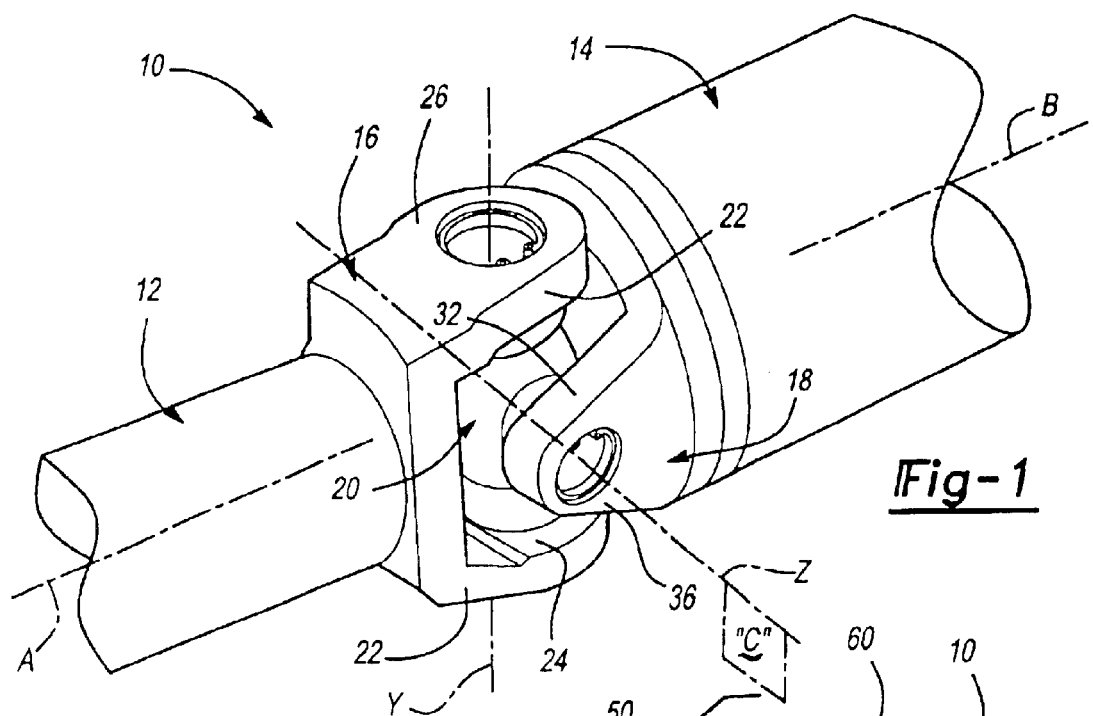
FIG. 1 is a perspective view of a universal joint according to the principals of the present invention.
Figure 2:
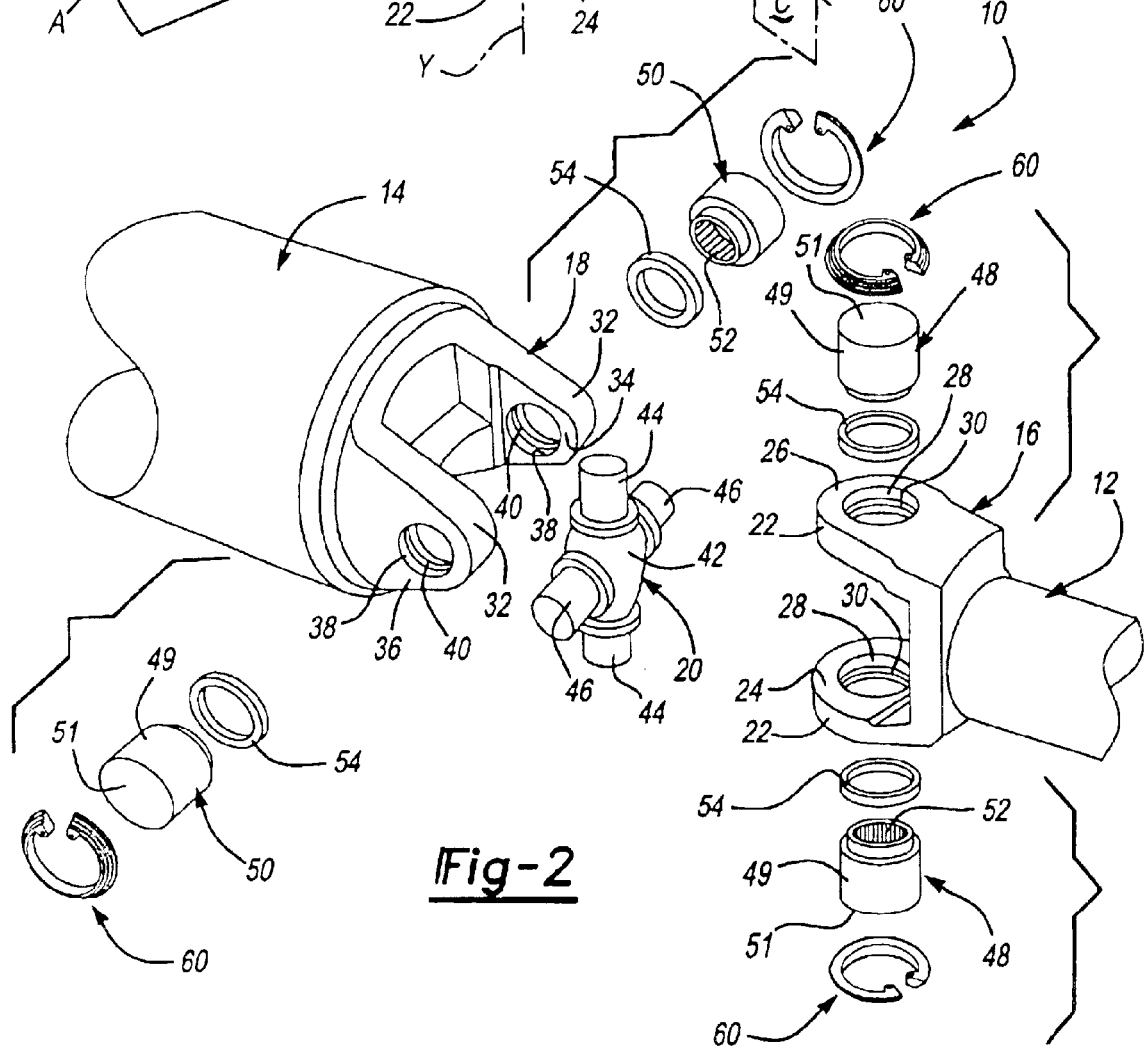
FIG. 2 is an exploded perspective view of the universal joint shown in FIG. 1.

Referring to FIGS. 1 and 2, a universal joint 10 is shown connecting a first shaft 12 to a second shaft 14. In general, universal joint 10 includes a first yoke 16 attached to an end of first shaft 12, a second yoke 18 attached to an end of second shaft 14 and a cruciform 20 interconnecting first yoke 16 to second yoke 18. The first yoke 16 is bifurcated and includes a pair of laterally spaced-apart legs 22 which are preferably symmetrical with respect to the rotary axis of first shaft 12, as denoted by construction line A. Legs 22 include an inboard surface 24 and an outboard surface 26 with an aperture 28 extending therebetween. Apertures 28 are aligned on a first trunnion axis, as denoted by construction line Y, which passes through and is orthogonal with respect to rotary axis A of first shaft 12. Each aperture 28 is a throughbore and includes an annular ring groove 30 positioned between the inboard surface 24 and the outboard surface 26.

Second yoke 18 is bifurcated and includes a pair of laterally-spaced legs 32 which are preferably symmetrical with respect to the rotary axis of second shaft 14, as denoted by construction line B. Legs 32 include an inboard surface 34 and an outboard surface 36 with an aperture 38 extending therebetween. Apertures 38 are aligned on a second trunnion axis, as denoted by construction line Z, which passes through and is orthogonal with respect to rotary axis B of second shaft 14. Apertures 38 are throughbores which include an annular groove 40 formed between the inboard surface 34 and the outboard surface 36. It should be noted that the shape and dimensions of apertures 28 and 38 may either be identical or different depending on the particular dimensions of cruciform 20 used therewith. It should also be noted that the annular ring grooves 30 and 40 may be formed by machining, casting or by similar technique.

As best seen in FIG. 2, cruciform 20 includes a central hub 42 from which a pair of first trunnions 44 and a pair of second trunnions 46 extend. First trunnions 44 are orthogonal with respect to second trunnions 46. First trunnions 44 are adapted for insertion into apertures 28 in legs 22 of first yoke 16 so as to be axially aligned on first trunnion axis Y. Similarly, second trunnions 46 are adapted to be inserted into apertures 38 in legs 32 of second yoke 18 so as to be axially aligned on second trunnion axis Z. With first trunnions 44 and second trunnions 46 installed in first and second yokes 16 and 18, respectfully, trunnion axes Y and Z pass through a common plane which orthogonally intersects the rotary axis of cruciform 20, shown in FIG. 1 by construction plane C.

Universal joint 10 also includes a first pair of bearing cups 48 adapted to be mounted in apertures 28 and a second pair of bearing cups 50 adapted to be mounted in apertures 38. First bearing cups 48 are provided for receiving and rotatably supporting first trunnions 44 in apertures 28. Similarly, second bearing cups 50 are provided for receiving and rotatably supporting second trunnions 46 in apertures 38. As seen, bearing cups 48 and 50 each include a tubular sleeve segment 49 enclosed by an end segment 51. A roller bearing assembly 52 is mounted in the sleeve segment for rotatably supporting trunnions 44 and 46 therein. In addition, annular elastomeric seals 54 are mounted on trunnions 44 and 46, respectively, for providing a sealed relationship with respect to the open end of the sleeve segments 49 of bearing cups 48 and 50, respectively.

Figure 3:
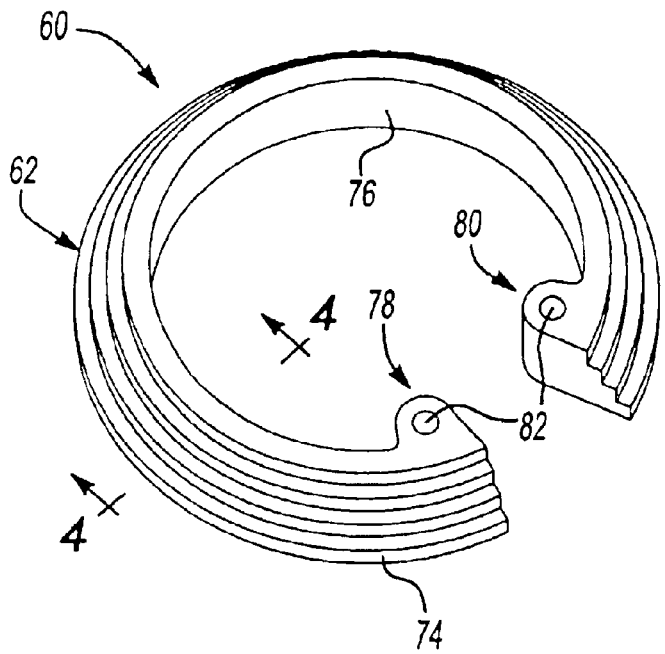
FIG. 3 is a perspective view of the retention member according to the principals of the present invention.

To assemble the universal joint 10, one of the bearing cups 48 is mounted on one of the first trunnions 44 prior to insertion thereof into its corresponding aperture 28 such that the terminal end surface of the trunnion is placed in abutting engagement with the end segment 51 of its corresponding bearing cup. Alternatively, trunnions 44 and 46 may be installed into corresponding apertures 28 and 38 with bearing cups 48 and 50 thereafter installed into apertures 28 and 38. For purposes of describing the cruciform alignment and retention device used in association with yokes 16 and 18, reference is now directed to FIGS. 3, 4 and 5. However, while the following disclosure is specifically directed to retention of cruciform 20 relative to first yoke 16, it is to be understood that a similar process is contemplated for use with second yoke 18.

Figure 4:
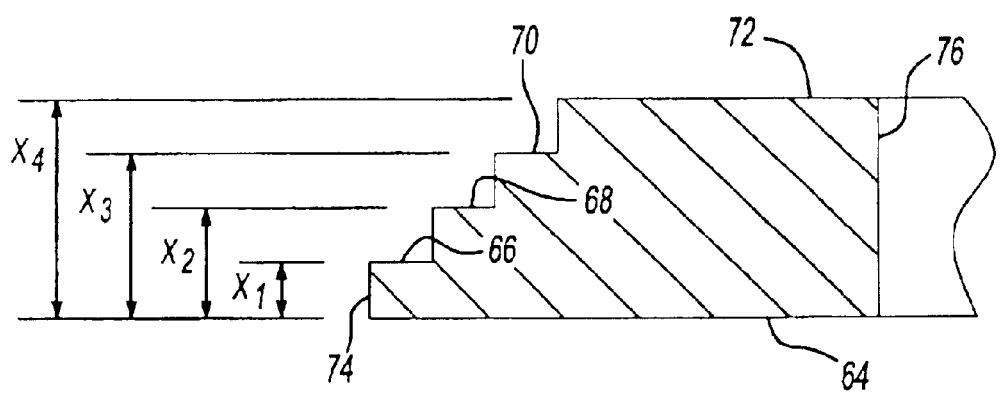
FIG. 4 is a sectional view of the retention member shown in FIG. 3.

Once rotary axis A of first shaft 12 is co-axially aligned with rotary axis B of second shaft 14, a retention member 60 cooperates with each bearing cup 48 to retain the aforementioned components in relation to each other. In reference to FIGS. 3 and 4, retention member 60 includes a C-shaped ring 62 having a bottom surface 64, a series of stepped surfaces 66, 68 and 70, and a top surface 72. Surfaces 64, 66, 68, 70 and 72 are positioned substantially parallel to one another. A first thickness $X_1$ is defined by the distance between surfaces 64 and 66. A second thickness $X_2$ is defined by the distance between surfaces 64 and 68. A third thickness $X_3$ is defined as the distance between surfaces 64 and 70. A fourth or overall thickness $X_4$ is defined by the distance between surfaces 64 and 72. Retention member 60 is shown having an exemplary number of stepped surfaces 66–70, however, it should be appreciated the retention member may include any number of surfaces selectively insertable within a gap defined by bearing cup 48 and ring groove 30 without departing from the scope of the present invention. As best shown in FIG. 4, thicknesses $X_1$–$X_4$ increase in a direction from an outer edge 74 toward an inner edge 76 of retention member 60. Ring 62 terminates at first and second ends 78 and 80, respectively, and includes apertures 82 extending therethrough to facilitate installation of retention member 60 as described in greater detail hereinafter. In order to provide resistance to permanent deformation during operation, the retention member 60 is preferably constructed from a resilient material such as spring steel.

Figure 5:
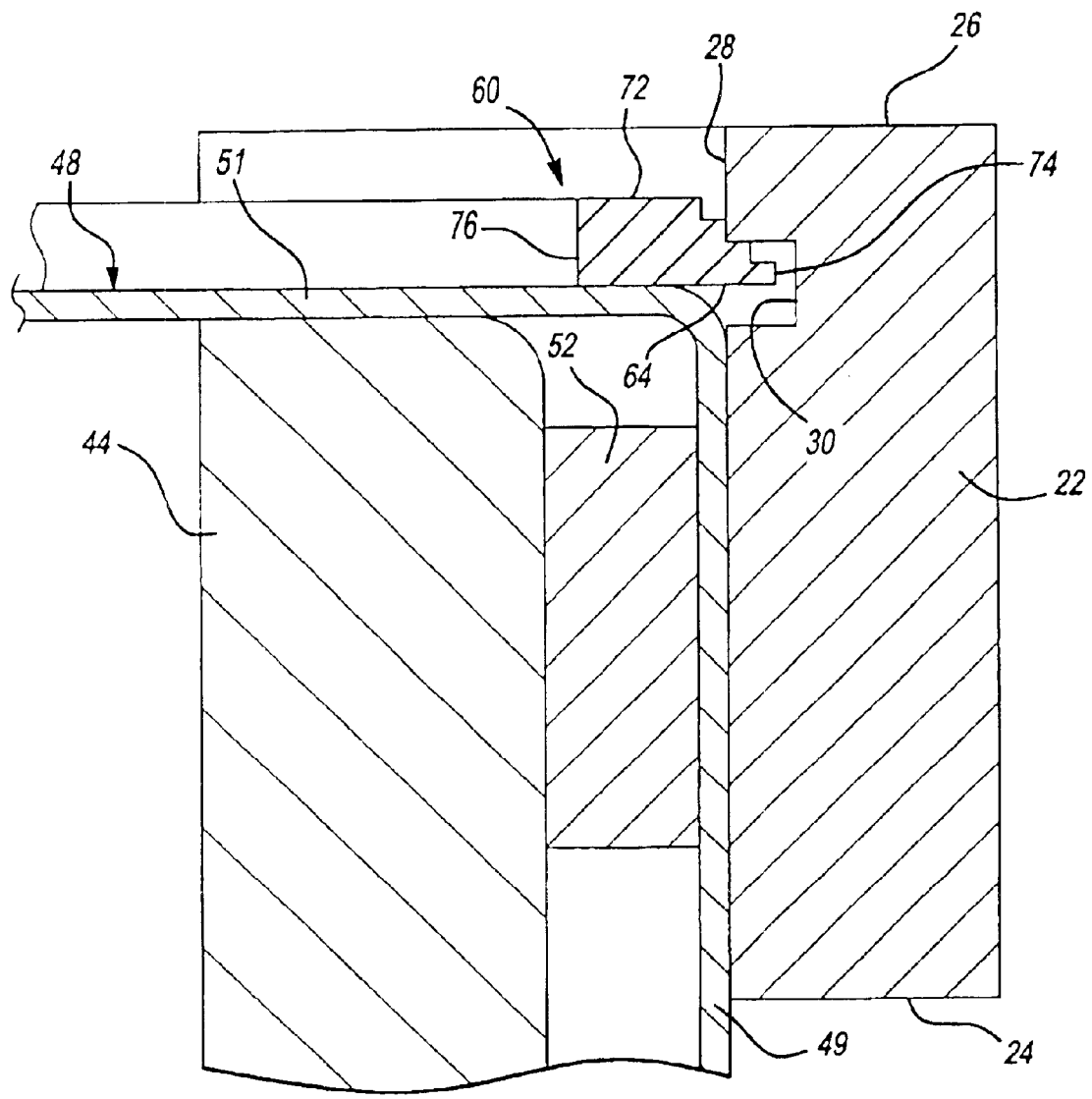
FIG. 5 is a partial sectional view of one of the yokes associated with the universal joint shown in FIGS. 1 and 2.

Referring to FIG. 5, universal joint 10 of the present invention is presented in an assembled state. Preferably, retention member 60 is installed by reducing the outer diameter of ring 62 with a tool (not shown) acting in cooperation with apertures 82 and disposing retention member 60 within aperture 28. Retention member 60 is inserted within the aperture 28 until bottom surface 64 contacts end segment 51 of bearing cup 48. After retention member 60 is positioned adjacent ring groove 30, the tool is released and ring 62 expands into ring groove 30. One skilled in the art will appreciate that the number of stepped surfaces positioned within groove 30 is merely exemplary and corresponds to the "stack-up" or summation of component tolerances described earlier. Care is taken to assure that the overall thickness of retention member 60 is great enough to account for component variation. Furthermore, the joint is designed and toleranced to ensure that at least one stepped surface may enter ring groove 30 to retain bearing cup 48.

Therefore, it should be appreciated that the configuration and operation of universal joint 10 provides both manufacturing and functional advantages over the prior art. Specifically, the universal joint 10 of the present invention utilizes a retention member to minimize component count, thereby easing assembly and reducing the cost of manufacture.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A universal joint comprising:
   a yoke including a leg having an aperture extending therethrough, said aperture including an annular groove;
   a cruciform having a trunnion;
   a bearing cup mounted on said trunnion, said bearing cup positioned in said aperture; and
   a retention member including a split ring circumferentially extending from a first end to a second end, said split ring having a substantially planar bottom surface and three substantially planar stepped surfaces offset from said bottom surface, each of said bottom and said stepped surfaces extending circumferentially substantially uninterrupted from said first end to said second end, wherein said bottom surface and at least one of said stepped surfaces is disposed in said groove, said stepped surfaces being urged radially outwardly to enter said groove.

2. The universal joint of claim 1 wherein said stepped surfaces are substantially parallel to one another.

3. The universal joint of claim 2 wherein said retention member includes an inner edge and an outer edge, said stepped surfaces being substantially parallel to said bottom surface such that a thickness of said retention member increases from said outer edge to said inner edge.

4. The universal joint of claim 1 wherein said bearing cup includes a sleeve segment and an end segment and wherein said substantially planar bottom surface engages said end segment of said bearing cup.

5. A universal joint comprising:

a yoke including a leg having a substantially cylindrical bore extending therethrough, said bore including an annular groove;

a cruciform having a trunnion;

a bearing cup mounted on said trunnion, said bearing cup including an end segment positioned proximate said annular groove;

a resilient open ring having a substantially planar bottom surface radially extending between an outer edge and an inner edge, said ring including a first riser surface extending from said outer edge substantially perpendicular to said bottom surface, a first tread radially extending between said first riser and a second riser, a second tread radially extending between said second riser and a third riser, wherein each of said risers extends substantially perpendicular to said bottom surface, said open ring defining a series of thicknesses between said bottom surface and each of said treads that increases from said outer edge to said inner edge, wherein at least said first riser and a portion of said bottom surface are positioned within said annular groove and one of said risers is biased into engagement with said bore.

6. The universal joint of claim 5 wherein said bottom surface of said open ring engages said end segment of said bearing cup.

7. The universal joint of claim 6 wherein said second riser is positioned within said annular groove and said third riser engages said bore.

8. The universal joint of claim 7 further including an uppermost riser terminating at said inner edge.

9. The universal joint of claim 8 wherein said open ring is deformable from a relaxed state to a compressed state, said open ring defining a first diameter larger than said bore when in said relaxed state, said open ring defining a second diameter smaller than said bore when in said compressed state, said open ring defining a third diameter intermediate said first and second diameters when one of said risers engage said bore.

10. A universal joint comprising:

a yoke including a leg having a substantially cylindrical bore extending therethrough, said bore including an annular groove;

a cruciform having a trunnion;

a bearing cup mounted on said trunnion, said bearing cup including an end segment positioned proximate said annular groove;

a discontinuous annular member including substantially planar upper and lower surfaces bounding three substantially concentrically arranged stepped surfaces offset from and substantially parallel to said lower surface, said discontinuous annular member being resiliently radially deformable to enter said bore and operable to radially outwardly expand into said annular groove, wherein said discontinuous annular member is operable to account for a variance in the position of said end segment relative to said annular groove.

11. The universal joint of claim 10 wherein a quantity of stepped surfaces enters said annular groove to account for said variance in the position of said end segment, wherein said quantity of stepped surfaces varies as said position of said end segment varies.

12. The universal joint of claim 11 wherein said substantially planar lower surface engages said end segment of said bearing cup.

13. The universal joint of claim 11 wherein a substantially vertically extending edge of one of said stepped surfaces engages said bore.

14. The universal joint of claim 10 wherein said discontinuous annular member is operable to minimize axial end play of said bearing cup relative to said trunnion.

* * * * *